US010386095B2

(12) United States Patent
Brounne

(10) Patent No.: US 10,386,095 B2
(45) Date of Patent: Aug. 20, 2019

(54) SOLAR COLLECTORS INCLUDING ACRYLIC BASED COVER SHEET AND METHODS FOR MAKING AND USING THE SAME

(71) Applicant: SABIC GLOBAL TECHNOLOGIES B.V., Bergen op Zoom (NL)

(72) Inventor: Marcel Brounne, Etten-Leur (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 58 days.

(21) Appl. No.: 15/514,591

(22) PCT Filed: Nov. 23, 2015

(86) PCT No.: PCT/IB2015/059045

§ 371 (c)(1),
(2) Date: Mar. 27, 2017

(87) PCT Pub. No.: WO2016/083979

PCT Pub. Date: Jun. 2, 2016

(65) Prior Publication Data

US 2017/0254567 A1 Sep. 7, 2017

Related U.S. Application Data

(60) Provisional application No. 62/084,023, filed on Nov. 25, 2014.

(51) Int. Cl.
*F24J 2/24* (2006.01)
*F24S 80/525* (2018.01)
(Continued)

(52) U.S. Cl.
CPC ............. *F24S 80/525* (2018.05); *B23P 19/00* (2013.01); *F24S 40/57* (2018.05); *F24S 80/40* (2018.05);
(Continued)

(58) Field of Classification Search
CPC ........ F24S 80/70; F24S 80/525; F24S 80/457; F24S 80/54; F24S 80/40; F24S 40/57; F24S 2025/011; F24S 2025/016; F24S 2025/021
(Continued)

(56) References Cited

U.S. PATENT DOCUMENTS 3,051,515 A * 8/1962 Graves .................. F16L 51/035
285/228
3,916,871 A * 11/1975 Estes ....................... F24S 80/54
126/666
(Continued)

FOREIGN PATENT DOCUMENTS

CA 1117834 2/1982
CN 102384592 A 3/2012
(Continued)

OTHER PUBLICATIONS

International Search Report for International Application No. PCT/IB2015/059045; International Filing Date: Nov. 23, 2015; dated Mar. 10, 2016; 6 Pages.
(Continued)

*Primary Examiner* — Gregory L Huson
*Assistant Examiner* — Daniel E Namay
(74) *Attorney, Agent, or Firm* — Cantor Colburn LLP

(57) ABSTRACT

A solar collector can comprise: a polymeric housing; a polymeric cover attached to the housing defining an internal volume of the solar collector; a solar energy absorber attached to the housing and located within an area defined by the housing and the cover; wherein the housing comprises a flexible sealing member; and wherein the cover comprises a honeycomb structure.

18 Claims, 2 Drawing Sheets

(51) Int. Cl.

| | |
|---|---|
| ***F24S 40/57*** | (2018.01) |
| ***F24S 80/40*** | (2018.01) |
| ***F24S 80/457*** | (2018.01) |
| ***B23P 19/00*** | (2006.01) |
| ***F24S 80/70*** | (2018.01) |
| ***F24S 80/54*** | (2018.01) |
| *F24J 2/20* | (2006.01) |
| *F24J 2/42* | (2006.01) |
| *F24J 2/46* | (2006.01) |
| *F24S 25/00* | (2018.01) |

(52) U.S. Cl.
CPC ............. *F24S 80/457* (2018.05); *F24S 80/54* (2018.05); *F24S 80/70* (2018.05); *F24S 2025/011* (2018.05); *F24S 2025/016* (2018.05); *Y02E 10/40* (2013.01)

(58) Field of Classification Search
USPC ................................. 126/705, 707, 709, 594
See application file for complete search history.

(56) References Cited

U.S. PATENT DOCUMENTS

| | | | | | |
|---|---|---|---|---|---|
| 4,133,298 | A * | 1/1979 | Hayama | F28F 13/00 126/591 |
| 4,323,053 | A | 4/1982 | McCullough et al. | |
| 4,334,524 | A | 6/1982 | McCullough et al. | |
| 4,375,216 | A * | 3/1983 | Gessford | F24S 70/275 126/712 |
| 4,452,230 | A * | 6/1984 | Nelson | E04B 1/74 126/621 |
| 4,625,711 | A | 12/1986 | Arai | |
| 4,803,972 | A * | 2/1989 | Janson | F24S 80/50 126/710 |
| 6,705,311 | B1 * | 3/2004 | Schwartzman | F24S 40/80 126/657 |
| 7,281,353 | B2 | 10/2007 | Konstantin | |
| 7,552,726 | B2 * | 6/2009 | Kuckelkorn | F24S 10/45 126/653 |
| 9,032,625 | B2 * | 5/2015 | Martinez Sanz | F24S 10/45 29/890.033 |
| 9,249,991 | B2 * | 2/2016 | Martinez Sanz | F24S 10/45 |
| 9,423,154 | B1 * | 8/2016 | Velasco | F24S 40/80 |
| 9,903,612 | B2 * | 2/2018 | Takeuchi | F16L 51/03 |
| 9,939,176 | B2 * | 4/2018 | Kuckelkorn | F24S 23/74 |
| 2004/0050381 | A1 * | 3/2004 | Kuckelkorn | F24S 10/45 126/690 |
| 2008/0216823 | A1 | 9/2008 | Kmetovicz et al. | |
| 2010/0006090 | A1 * | 1/2010 | Palmieri | C03C 27/02 126/704 |
| 2011/0162637 | A1 * | 7/2011 | Hahn | G02B 26/0825 126/600 |
| 2012/0186576 | A1 * | 7/2012 | Kuckelkorn | F24S 23/74 126/653 |
| 2012/0222669 | A1 | 9/2012 | Sellier et al. | |
| 2012/0251336 | A1 * | 10/2012 | Martinez Sanz | H01J 7/186 417/48 |
| 2014/0305425 | A1 | 10/2014 | Prutsman et al. | |

FOREIGN PATENT DOCUMENTS

| | | | | |
|---|---|---|---|---|
| CN | 103562653 A | | 2/2014 | |
| CN | 203744561 U | | 7/2014 | |
| DE | 20311784 U1 | | 1/2004 | |
| EP | 2522927 A2 | | 11/2012 | |
| JP | 58052933 A | * | 3/1983 | F24S 10/45 |
| WO | 8101188 A1 | | 4/1981 | |

OTHER PUBLICATIONS

Machine Translation of CN102384592(A); Date of Publication: Mar. 21, 2012; 7 Pages.
Machine Translation of DE20311784; Date of Publication: Jan. 15, 2004; 8 Pages.
written Opinion of the International Searching Authority; International Application No. PCT/IB2015/059045; International Filing Date: Nov. 23, 2015; dated Mar. 10, 2016; 8 Pages.
Machine Translation of CN103562653A; Date of Publication: Feb. 5, 2014; 5 Pages.

* cited by examiner

SOLAR COLLECTORS INCLUDING ACRYLIC BASED COVER SHEET AND METHODS FOR MAKING AND USING THE SAME

CROSS REFERENCE TO RELATED APPLICATIONS

This application is a 371 of International Application No. PCT/IB2015/059045, filed Nov. 23, 2015, which claims priority to U.S. Application Ser. No. 62/084,023, filed Nov. 25, 2014 which are incorporated herein by reference in their entirety.

Disclosed herein are solar collectors, and in particular, solar collectors including an acrylic-based honeycomb front sheet.

BACKGROUND

Solar collectors can be efficient and cost-effective sources of hot water for domestic and commercial hot water heating as well as for space heating. A solar collector can comprise a front sheet, generally made from a transparent or semi-transparent material such as glass, a polymer, or like materials. When the front sheet is a glass layer, a frame is typically required, which can generally be made of aluminum. The frame and the glass layer are the biggest contributors to the weight of the solar collector assemblies, which can make the assemblies generally heavy and expensive to produce. As such, attempts have been made to produce an all polymeric, lower weight solar collector.

Polymeric solar collectors can be constructed from a transparent polymer glazing sheet (e.g., polycarbonate multi-wall sheet), a black polymeric absorber with extruded water channels (e.g., polysulfone or polyphenylene ether blend multi-wall sheet), an insulating backing, and water manifolds and frame pieces. Since the absorber can be insulated from both the front and back, temperatures much higher than ambient can be attained. Solar collectors are commonly designed to produce water as hot as 70 degrees Celsius (° C.) to 80° C.

However, when certain polymers are used for making a solar collector assembly the resulting mechanical properties and/or the optical efficiency of the solar collector assembly can be lower than a glass/metal assembly. For example, certain polymeric materials, such as poly(methyl methacrylate) (PMMA), can be good for light transmission (i.e., high optical efficiency), but lack mechanical qualities such as impact performance. Other polymeric materials, such as polycarbonate (PC), have good mechanical properties, but a decreased optical efficiency.

Accordingly, there is a need for a solar collector that is light weight, optically efficient, and has good mechanical properties.

SUMMARY

Disclosed, in various embodiments, are solar collectors and methods for making and using the same.

A solar collector can comprise: a polymeric housing; a polymeric cover attached to the housing defining an internal volume of the solar collector; a solar energy absorber attached to the housing and located within an area defined by the housing and the cover; wherein the housing comprises a flexible sealing member; and wherein the cover comprises a honeycomb structure.

A solar collector can comprise: a polymeric housing; a polymeric cover sealed to the housing; a solar energy absorber located between the housing and the cover; wherein the housing comprises an opening; wherein the opening is sealed with a flexible sealing member; and wherein the cover comprises a honeycomb structure.

A method of making a solar collector can comprise: disposing a solar energy absorber between a polymeric cover and a polymeric housing; wherein the cover comprises a honeycomb structure; wherein the housing includes an opening; sealing the opening with a flexible sealing member; and sealing the cover to the housing.

A method of making a solar collector can comprise: locating a solar energy absorber between a polymeric cover and a polymeric housing; sealing the cover to the housing to form an internal volume; filling the internal volume with nitrogen gas; wherein the cover comprises a honeycomb structure; wherein the housing includes a flexible sealing member.

These and other features and characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
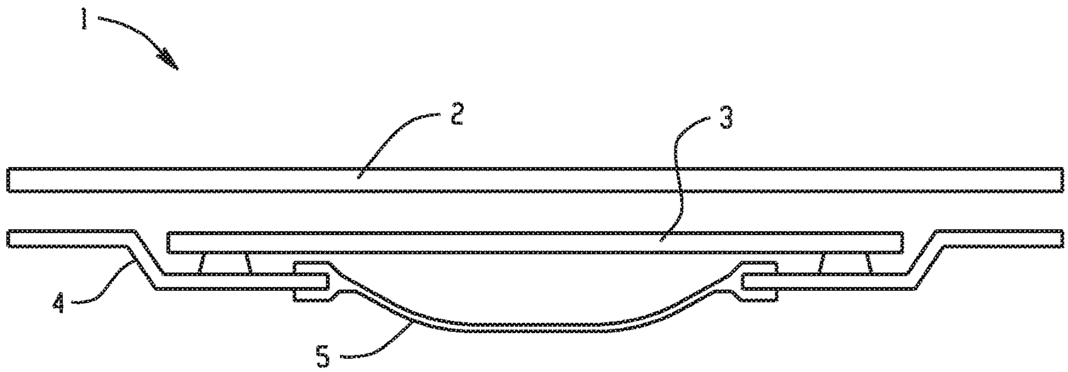
FIG. 1 is a schematic representation of the individual components of a solar collector assembly.

Disclosed herein polymeric solar collectors that are light weight, have a high optical efficiency, and good mechanical properties. In particular, the solar collectors include a polymeric honeycomb cover, which exhibits a high impact strength and transparency. The solar collectors can include a flexible sealing member that expands and contracts to accommodate changes in internal temperature and prevents bulging of the cover. In addition, the solar collectors can include a gas, such as nitrogen, sealed within an internal volume to prevent the growth of algae and/or to reduce the oxygenation of the components.

As disclosed herein, a polymeric solar collector can include a cover, housing, and a solar energy absorber. The cover can include a polymeric material in a honeycomb structure, and can be located above solar energy absorber. The honeycomb structure can comprise cells have lateral cell walls which adjoin one another in the form of a ring, e.g., forming hexagonal cells. The honeycomb structure increases the mechanical properties of the cover, which enables the use of materials with high optical efficiency that would not otherwise have sufficient mechanical properties. The honeycomb panel can generally be transparent (e.g., have greater than or equal to 60 to 90% solar radiation (λ, between 300 nanometers (nm) and 2500 nm) transmission. Percent light transmission can be determined according to ISO 9060:1990 using a pyranometer (e.g., a thermopile pyranometer). The transmission can be greater than or equal to 80% as measured according to ISO 9060:1990. The honeycomb panel (also referred to as the cover) can include and acrylic-based polymeric material. For example, the cover can include poly(methyl methacrylate) (PMMA). The PMMA can be free of UV stabilizers. The cover can include a polycarbonate (PC) copolymer (e.g., LEXAN™ SLX), polyimide (e.g., PA12), polyvinylidene fluoride (PVDF), cyclic olefin polymer (COP), cyclic olefin copolymer (COC), combinations including at least one of the foregoing. In addition, the honeycomb panel can direct light to the solar energy absorber. In other words, the perpendicular arrangement of the hexagons directs light toward the absorber, which reduces reflection losses and increases efficiency. In the alternative, the cover can include a multiwall structure (MWS) including two or more horizontal layers of sheets spaced apart, where the sheets are extruded, held together, bonded, or connected with various types of reinforcing structures, variously called as ribs, struts, slats, webs, and the like. The cover can have a thickness of 4 mm to 30 mm.

The use of a polymeric cover to replace the glass in a solar collector assembly allows for a much lighter assembly (e.g., 10 kilograms per square meter ($kg/m^2$) for assemblies without glass as compared to 13 $kg/m^2$ for assemblies with glass), which can allow placement on roofs having limited load bearing capacity (e.g., flat roofs). In addition the use of a polymeric cover can allow for replacing an aluminum frame and back layer with an integrated plastic frame. Solar collector assemblies with fewer components or with components that are integrated with one another (e.g., the junction box, cables, and/or connectors integrated with the frame) can decrease the amount of time necessary for production and assembly of the solar collector.

The housing can be made from a polymeric material that is capable of being laser welded to the cover. For example, the housing can be thermoformed from a blend of polycarbonate and Acrylonitrile Styrene Acrylate (ASA). The housing can include a material that is ultraviolet (UV) stable (e.g., does not degrade due to exposure to UV light), and does not require additional UV stabilizers. For example, the housing can include polycarbonate, polypropylene copolymer, polyphenylene (e.g., Noryl* PPX), Noryl* resin, polyamide (e.g., PA6.6) and combinations including at least one of the foregoing.

A flexible sealing member can be attached to the housing. The flexible sealing member can form an airtight seal with the housing. The flexible sealing member can be overmolded onto the housing. The flexible sealing member can react to changes in temperature and pressure within the solar collector assembly. For example, as the temperature increases inside the solar collector, the flexible sealing member can move to expand the internal volume of the solar collector, which prevents pressure build up and eliminates bulging of the top cover due to internal pressure. For example, when the temperature inside the solar collector exceeds a stagnation temperature (e.g., in excess of 130° C. or even 140° C.), the flexible sealing member can expand to alleviate pressure inside the solar collector. The flexible sealing member can be made of a polymeric material that is compatible with overmolding to the housing. For example, the flexible sealing member can include a thermoplastic elastomer material such as thermoplastic polyurethane (TPU), styrene-ethylene/butylene-styrene (SEBS), styrene-ethylene/propylene-styrene (SEPS), and combinations including at least one of the foregoing. The flexible sealing member can have a thickness of 0.5 to 5 mm.

The cover can be attached to the housing via a variety of attachment mechanisms including adhesive, a clamping mechanism, and/or welding (e.g., ultrasonic or laser welding). The cover and housing can form an airtight seal that can prevent moisture and particulates from entering the interior of the solar collector.

The cover can be laser welded to the housing to form an interior volume that is air tight. Laser welding allows for an efficient process with low equipment cost and flexibility in contours and low cycle time. Laser welding includes the joining together two components with different light absorption properties. For example, one of the components can be transparent to the wavelength of the laser beam, whereas the other component can absorb the energy of the laser beam. During the laser welding process, the laser beam can pass through a first (i.e., transparent) component and when the laser beam hits the surface of the second (i.e., absorbent) component, the light from the laser beam is absorbed and converted into heat. This heat is then passed into the transparent component by thermal conduction, causing the material of both components to melt, and weld together. The laser can operate in the infrared range (IR) of the electromagnetic spectrum (e.g., wavelengths of 700 to 1200 nanometers (nm)), which is referred to as IR laser welding.

It can be desirable for the cover and the housing to have certain optical properties when laser welding the parts. For example, since two parts that exhibit transparency within a certain spectrum of light cannot be welded together, the cover can be transparent to light of a certain wavelength (e.g., wavelengths in the IR spectrum of 700 to 1200 nm), while the housing can be semi-transparent or opaque (e.g., IR absorbing to allow for laser welding). In the alternative, the housing can be transparent to light of a certain wavelength (e.g., wavelengths in the IR spectrum of 700 to 1200 nm), while the cover can be semi-transparent or opaque (e.g., IR absorbing to allow for laser welding). Laser welding can offer many advantages including a shorter cycle time as compared to molding the components and then attaching the components together in an additional step. In addition, laser welding does not generate dust that can become entrapped within the interior volume. Furthermore, laser welding the cover and the housing forms an air tight seal that can prevent moisture and particulates from entering the interior of the solar collector.

The interior volume formed by the cover and the housing can be filled with a gas to advantageously prevent the growth of algae and also reduces oxidation of the thermoplastic materials (e.g., absorber, cover, housing, and the like). The flexible sealing member can be overmolded onto the housing. The housing and cover can be sealed together. The gas can be introduced to the area between the cover and the housing (e.g., the interior volume) via a needle through the flexible sealing member. For example, the interior volume can be filled with nitrogen gas or argon gas.

The solar energy absorber can be located within the interior volume formed by the cover and the housing. The solar energy absorber can be black, meaning that it will not have any transmission. The solar energy absorber can absorb incoming light and transfer the energy to a circulating fluid, such as air, water, ethylene glycol, and the like. The solar energy absorber can be made of any material with the desired thermal and hydrolytic stability. Examples include polysulfones, modified poly(phenylene oxides), polyetheretherketone (PEEK), polyimide, and combinations comprising at least one of the foregoing.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 illustrates a solar collector. As shown in FIG. 1, solar collector 1 includes cover 2, absorber 3, housing 4, and flexible sealing member 5. Cover 2 can include a honeycomb structure. Cover 2 can include a polymeric material with high optical efficiency. For example, cover 2 can generally be transparent (e.g., have greater than or equal to 60 to 80% solar radiation (λ, between 300 nanometers (nm) and 2500 nm) transmission). The transmission can be greater than or equal to 80% as measured according to ISO 9060: 1990. Cover 2 can include and acrylic-based polymeric material. For example, cover 2 can include poly(methyl methacrylate) (PMMA). The cover can include a polycarbonate (PC) copolymer (e.g., LEXAN™ SLX).

Figure 2:
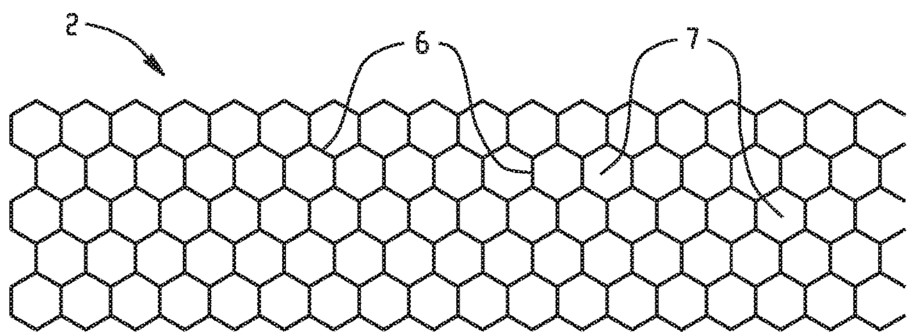
FIG. 2 is a top view of a cover for a solar collector.
Figure 3:
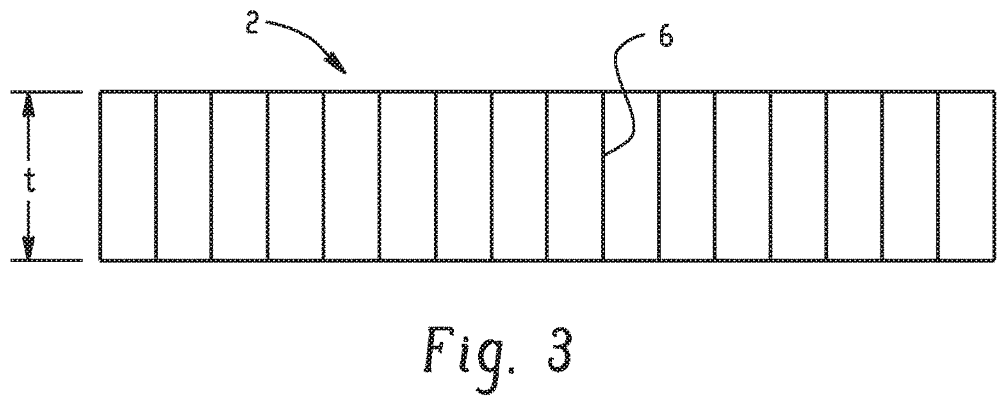
FIG. 3 is side view of the cover of FIG. 2.

FIG. 2 illustrates a top view of a honeycomb cover 2. As show in FIG. 2, cover 2 includes several hexagonal shaped cells 7 having common cell walls 6. FIG. 3 illustrates a side view of cover 2. As shown in FIG. 3, cover 2 can have a thickness (t). Thickness (t) can be 4 to 30 mm.

Cover 2 can be attached to housing 4 to form an interior volume. Cover 2 can be joined to housing 4 to form an airtight seal between cover 2 and housing 4. For example, cover 1 can be laser welded to housing 2. Absorber 3 can be located within the interior volume and attached to housing 4. Housing 4 can include an opening that can be closed or sealed with flexible sealing member 5. For example, flexible sealing member 5 can be overmolded onto housing 4 prior to housing 4 is attached to cover 2. Flexible sealing member 5 allows for the introduction of a gas into the interior volume formed by housing 4 and cover 2. For example, nitrogen gas can be introduced into the interior volume via a needle to inhibit and/or eliminate algae growth. In addition, flexible sealing member 5 can expand in response to temperature changes, which eliminates the possibility of bulging or deformation of cover 2 due to internal pressure.

Figure 4:
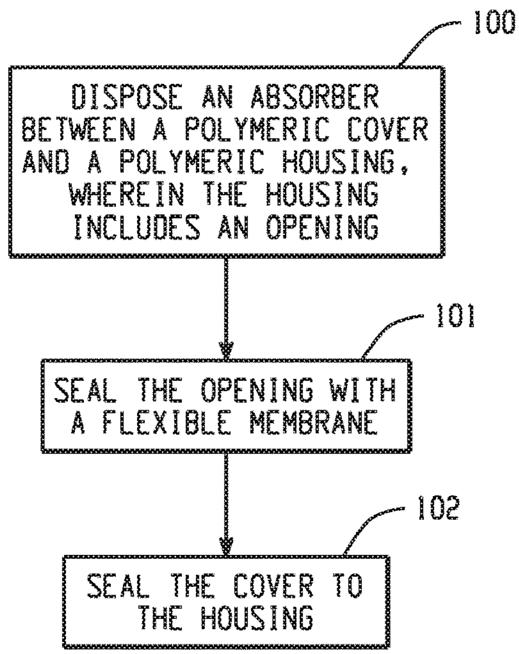
FIG. 4 is a diagram illustrating a process for making a solar collector.

FIG. 4 illustrates a method a making a solar collector. As shown in FIG. 4, step 100 includes disposing an absorber between a polymeric cover and a polymeric housing. The polymeric cover can include a honeycomb structure. The housing can include an opening. The absorber can be attached to the housing. In step 101, the opening is sealed with a flexible sealing member. For example, the flexible sealing member can be overmolded onto the housing. Step 102 includes sealing the cover to the housing. For example, the cover can be laser welded to the housing.

Figure 5:
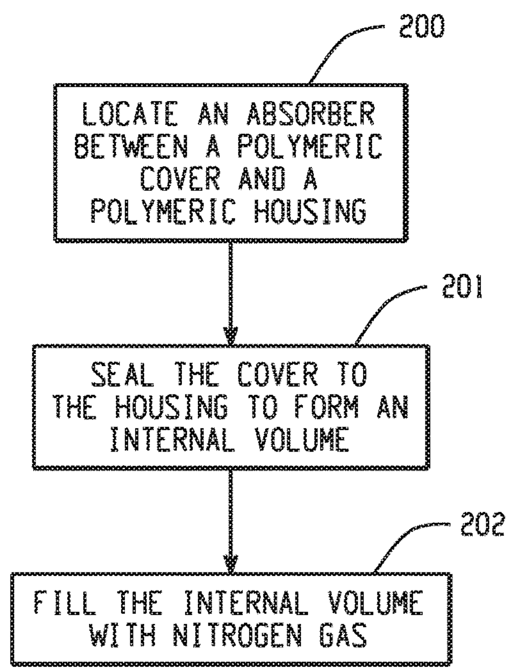
FIG. 5 is a diagram illustrating another process for making a solar collector.

FIG. 5 illustrates a method of making a solar collector. As shown in FIG. 5, an absorber is located between a polymeric cover and a polymeric housing in Step 200. The cover can include a honeycomb structure. The housing can include a flexible sealing member. The cover is sealed to the housing to form an internal volume in Step 201. The internal volume can be filled with nitrogen gas in step 202.

The solar collectors disclosed herein have good stiffness to weight ratio and good thermal insulation (e.g., due to the gas pockets in the honeycomb structure).

Set forth below are some embodiments of solar collectors, and methods of making the solar collectors.

Embodiment 1

A solar collector comprising: a polymeric housing; a polymeric cover attached to the housing defining an internal volume of the solar collector; a solar energy absorber attached to the housing and located within an area defined by the housing and the cover; wherein the housing comprises a flexible sealing member; and wherein the cover comprises a honeycomb structure.

Embodiment 2

A solar collector comprising: a polymeric housing; a polymeric cover sealed to the housing; a solar energy absorber located between the housing and the cover; wherein the housing comprises an opening; wherein the opening is sealed with a flexible sealing member; and wherein the cover comprises a honeycomb structure.

Embodiment 3

The solar collector of Embodiments 1 or 2, wherein the cover comprises poly(methyl methacrylate) polycarbonate copolymer, polyamide, polyvinylidene fluoride, cyclic olefin polymer, cyclic olefin copolymer, and combinations including at least one of the foregoing.

Embodiment 4

The solar collector of any of Embodiments 1-3, wherein the housing comprises polycarbonate, acrylonitrile styrene acrylate, polypropylene copolymer, polyphenylene, polyamide and combinations including at least one of the foregoing.

Embodiment 5

The solar collector of any of Embodiments 1-4, wherein the housing is laser welded to the cover.

Embodiment 6

The solar collector of any of Embodiments 1-5, wherein the internal volume of the solar collector comprises nitrogen gas and/or argon gas.

Embodiment 7

The solar collector of any of Embodiments 1-6, wherein the flexible sealing member comprises a thermoplastic elastomer.

Embodiment 8

The solar collector of any of Embodiments 1-7, wherein the flexible sealing member comprises thermoplastic polyurethane, styrene-ethylene/butylene-styrene, styrene-ethylene/propylene-styrene, and combinations including at least one of the foregoing.

Embodiment 9

The solar collector of any of Embodiments 1-8, wherein the cover is free from UV stabilizers.

Embodiment 10

The solar collector of any of Embodiments 1-9, wherein the flexible sealing member is overmolded onto the housing.

Embodiment 11

The solar collector of any of Embodiments 1-10, wherein the cover has a thickness of 4 mm to 30 mm.

Embodiment 12

A method of making a solar thermal collector, comprising: disposing a solar energy absorber between a polymeric cover and a polymeric housing; wherein the cover comprises a honeycomb structure; wherein the housing includes an opening; sealing the opening with a flexible sealing member; and sealing the cover to the housing.

Embodiment 13

A method of making a solar thermal collector, comprising; locating a solar energy absorber between a polymeric cover and a polymeric housing; sealing the cover to the housing to form an internal volume; filling the internal volume with nitrogen gas; wherein the cover comprises a honeycomb structure; wherein the housing includes a flexible sealing member.

Embodiment 14

The method of Embodiments 12 or 13, further comprising filling the internal volume of the solar collector with nitrogen gas and/or argon gas.

Embodiment 15

The method of Embodiments 12-14, wherein sealing the cover to the housing comprises laser welding.

Embodiment 16

The method of any of Embodiments 12-15, wherein the cover comprises poly(methyl methacrylate) polycarbonate copolymer, polyamide, polyvinylidene fluoride, cyclic olefin polymer, cyclic olefin copolymer, and combinations including at least one of the foregoing.

Embodiment 17

The method of any of Embodiments 12-16, wherein the housing comprises polycarbonate, acrylonitrile styrene acrylate, polypropylene copolymer, polyphenylene, polyamide and combinations including at least one of the foregoing.

Embodiment 18

The method of any of Embodiments 12-17, wherein the flexible sealing member comprises a thermoplastic elastomer.

Embodiment 19

The method of any of Embodiments 12-18, wherein the flexible sealing member comprises thermoplastic polyurethane, styrene-ethylene/butylene-styrene, styrene-ethylene/propylene-styrene, and combinations including at least one of the foregoing.

Embodiment 20

The method of any of Embodiments 12-19, wherein the cover is free from UV stabilizers.

Embodiment 21

The method of any of Embodiments 12-20, wherein sealing the opening with a flexible sealing member comprises overmolding the flexible sealing member onto the housing to form an airtight seal.

Embodiment 22

The method of any of Embodiments 12-21, wherein the cover has a thickness of 4 mm to 30 mm.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to determine one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A solar collector comprising:

a polymeric housing;

a polymeric cover attached and sealed to the housing, defining an internal volume of the solar collector;

a solar energy absorber located between the housing and the cover and attached to the housing;

wherein the housing comprises an opening opposite of the cover;

wherein the opening is sealed with a flexible sealing member; and wherein the cover comprises a honeycomb structure.

2. The solar collector of claim 1, wherein the cover comprises poly(methyl methacrylate) polycarbonate copolymer, polyamide, polyvinylidene fluoride, cyclic olefin polymer, cyclic olefin copolymer, and combinations including at least one of the foregoing; and wherein the housing comprises polycarbonate, acrylonitrile styrene acrylate, polypropylene copolymer, polyphenylene, polyamide and combinations including at least one of the foregoing.

3. The solar collector of claim 1, wherein the housing is laser welded to the cover.

4. The solar collector of claim 1, wherein the internal volume of the solar collector comprises nitrogen gas and/or argon gas.

5. The solar collector of claim 1, wherein the flexible sealing member comprises a thermoplastic elastomer.

6. The solar collector of claim 1, wherein the flexible sealing member comprises thermoplastic polyurethane, styrene-ethylene/butylene-styrene, styrene-ethylene/propylene-styrene, and combinations including at least one of the foregoing.

7. The solar collector of claim 1, wherein the cover is free from UV stabilizers.

8. The solar collector of claim 1, wherein the flexible sealing member is overmolded onto the housing thereby closing the opening in the housing.

9. The solar collector of claim 1, wherein the cover has a thickness of 4 mm to 30 mm.

10. A method of making the solar thermal collector of claim 1, comprising:

disposing the solar energy absorber between the polymeric cover and the polymeric housing;

sealing the cover to the housing to form an internal volume; and sealing the opening with the flexible sealing member.

11. The method of claim 10, further comprising filling the internal volume of the solar collector with nitrogen gas and/or argon gas.

12. The method of claim 10, wherein sealing the cover to the housing comprises laser welding.

13. The method of claim 10, wherein the cover comprises poly(methyl methacrylate) polycarbonate copolymer, polyamide, polyvinylidene fluoride, cyclic olefin polymer, cyclic olefin copolymer, and combinations including at least one of the foregoing; and wherein the housing comprises polycarbonate, acrylonitrile styrene acrylate, polypropylene copolymer, polyphenylene, polyamide and combinations including at least one of the foregoing.

14. The method of claim 10, wherein the flexible sealing member comprises a thermoplastic elastomer.

15. The method of claim 10, wherein the flexible sealing member comprises thermoplastic polyurethane, styrene-ethylene/butylene-styrene, styrene-ethylene/propylene-styrene, and combinations including at least one of the foregoing.

16. The method of claim 10, wherein the cover is free from UV stabilizers.

17. The method of claim 10, wherein sealing the opening with a flexible sealing member comprises overmolding the flexible sealing member onto the housing to form an airtight seal and thereby closing the opening.

18. The method of claim 10, wherein the cover has a thickness of 4 mm to 30 mm.

* * * * *